May 9, 1967     A. LEMPICKI ETAL     3,319,183

OPTICAL MASER CELL FOR USE WITH LIQUID MEDIA

Filed April 30, 1963

INVENTORS.
ALEXANDER LEMPICKI
KARL H. WEISE

BY R. J. Frank

ATTORNEY.

United States Patent Office 3,319,183
Patented May 9, 1967

---

3,319,183
OPTICAL MASER CELL FOR USE WITH LIQUID MEDIA
Alexander Lempicki, New Hyde Park, and Karl H. Weise, Hicksville, N.Y., assignors to General Telephone and Electronics Laboratories, Inc., a corporation of Delaware
Filed Apr. 30, 1963, Ser. No. 276,890
2 Claims. (Cl. 331—94.5)

This invention relates to optical masers and in particular to an optical maser cell for obtaining stimulated emission from liquid media.

The term "maser" is an acronym for "microwave amplification by stimulated emission of radiation" and an optical maser, or laser, is a maser designed for producing stimulated radiation at a frequency falling within the range of light frequencies. Light frequencies are defined as those frequencies falling within the band including the infrared and ultraviolet or between $2 \times 10^6$ Angstroms and 100 Angstroms.

The operation of maser devices depends upon the interaction of radiation and matter. More particularly, according to present theory, radiation consists of an accumulation of photons, each of which has a quantity of energy associated with it. This accumulation of photons constitutes an electromagnetic wave. When all photons have the same energy, the wave will have one frequency uniquely determined by the photon energy. When the photons have different energies, the wave will contain a plurality of wave components of different frequencies, these frequencies corresponding to the various photon energies.

Interaction of radiation with matter ensues when matter (i.e. atoms or molecules) either absorbs or emits photons. Usually, atoms and molecules exist in a stable non-radiating or ground state in which energy is not emitted. This state corresponds to a fixed quantity or level of internal energy. When an atom is in the ground state and interacts with an incident photon, the atom can absorb the energy of the photon and be placed in a higher or "excited" state, provided that the energy of the photon is at least equal to the difference in energy of the ground and excited states. Similarly, when the energy level of an atom is suddenly changed from one state to a lower energy state, a photon of radiation may be produced. The energy of this photon will be equal to the difference in energy between these states.

An atom in an excited state can emit a photon spontaneously and revert to its ground state or to some intermediate state. However, during the period in which the atom is still excited, it can be stimulated to emit a photon by interacting with an incident photon if the energy of this photon is equal to that of the photon which would otherwise be emitted spontaneously. As a result, the incoming photon or wave is augmented by the one given up by the excited atom. This released wave falls in phase with the wave that triggered its release. Hence, an amplifying action ensues. This phenomenon is known as stimulated emission.

Under ordinary conditions, there are more atoms in the lower energy states than in the higher states. In the maser, the distribution of electrons among the energy levels is changed by a process of "pumping" so that there will be more atoms in the higher than in the lower states. (The process of pumping consists of injecting electromagnetic energy into the assemblage of atoms to raise the atoms into excited states.) Then, incident photons of the lowest energy can produce more downward than upward transitions and stimulated emission can be produced.

In the maser, a suitable active material is enclosed in a cavity resonator having at least two separated reflecting walls. A wave starting out anywhere between the walls of the chamber will grow in amplitude until the wave reaches either wall where it will be reflected back into the medium. Inevitably there are losses due to imperfect reflections, absorption and scattering. However, if the amplification by stimulated emission is large enough to compensate for these losses, a steady wave can build up in the resonator.

A wave that starts at any position between the silvered ends (which act as mirrors) of the resonator will travel toward one end with increasing amplitude. When it reaches the end, the wave is reflected back toward the starting point with further increase in amplitude. The gain in energy of the wave during repeated passages compensates for losses at the mirrors and elsewhere and a steady wave will build up. Each time the wave is reflected at an end, a very small portion of the wave passes through this end. This portion is continually reinforced because of repeated reflections, and thus reinforced, constitutes the maser output wave.

The output of the maser is highly directional since the waves which are emitted must make many repeated passages without deviating very much from a path along the axis of the resonator. (If a wave is inclined at an angle with respect to this path, it will leave the resonator after few if any repeated reflections and will not have the opportunity to grow appreciably in amplitude.) The output waves are monochromatic (i.e. have essentially a single frequency) since stimulated emission takes place most strongly at frequencies in the middle of the band of frequencies emitted by spontaneous radiation. The initial stimulated emission at these frequencies will cause further emission at the same frequencies so that the output waves will contain only an extremely narrow range of frequencies or wavelengths.

Optical masers employing solid maser materials are well known. In a typical solid state optical maser, the active material comprises a crystalline body such as a single crystal of chromium doped ruby formed in a circular cylinder having partially silvered optically flat end surfaces. The fabrication of material of this type requires careful control of dimensions and preparation of the reflecting surfaces. Further, once such a crystal has been formed its characteristics can not be readily modified.

Gaseous optical masers, which typically employ a mixture of neon and helium gases confined within an elongated glass tube sealed at both ends, are also well known. However, the gas filled maser must be carefully sealed to prevent contamination of the gas and, once sealed, the gas cannot be changed without destroying the seals.

Accordingly it is an object of our invention to provide an optical maser cell which may be used with an active material in the liquid state thereby overcoming the above mentioned disadvantages of solid and gas masers.

Another object is to provide an optical maser cell which automatically compensates for changes in the volume of the active liquid material with variations in temperature.

Still another object is to provide an optical maser cell for use with active liquid materials which is axially symmetrical, easily mounted within a spiral flash tube and dewar flask, and in which the mirror alignment may be permanently and accurately established during fabrication of the cell.

Yet another object is to provide an optical maser cell for use with liquid materials in which no fill hole or reservoir is required to allow for liquid contraction and therefore may be oriented in any direction.

A further object is to provide an optical maser cell in which the length of the cavity may be readily adjusted to obtain optimum operation.

In the present invention an optical maser cell is provided which comprises a hollow elongated enclosure having a transparent portion and first and second open ends. First and second spaced apart end elements having facing reflective surfaces are positioned within the elongated enclosure, at least one of the end elements being slidable along the longitudinal axis of the enclosure. Also, at least one of the elements is transparent and has a partially transmissive reflecting surface.

The inside of the enclosure and the two end elements form a cavity in which the active material is placed. A light source is provided outside the transparent portion of the enclosure for irradiating the cavity, the radiation resulting from stimulation of the material in the cavity passing through the transparent end element.

In one embodiment of the invention which is particularly suited for use with an active liquid medium operating at reduced temperatures, the transparent enclosure is placed within a transparent dewar flask and a helical flash tube placed around the flask. As the temperature is reduced, the volume of the liquid and the pressure inside the cavity decrease causing the end elements to move closer together compensating for the change in volume of the liquid. The mirrors are kept in contact with the liquid by atmospheric pressure and by surface tension thereby assuring that the laser cell is homogeneously filled.

The above objects of and the brief introduction to the present invention will be more fully understood and further objects and advantages will become apparent from a study of the following description in connection with the drawings, wherein.

Figure 1:
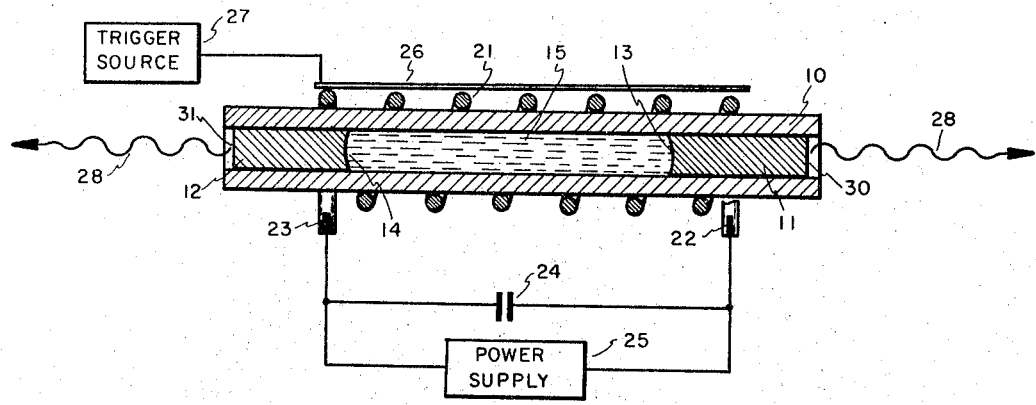
FIG. 1 is a schematic representation of our optical maser cell.

Referring to FIG. 1, there is shown an optical maser comprising a hollow transparent cylinder 10 which may be made of quartz or other optically transparent material having a low temperature coefficient of expansion. By optically transparent it is meant that the walls of cylinder 10 transmit radiation with negligible attenuation at the frequency required to pump the maser. The bore of cylinder 10 is accurately and uniformly ground and first and second quartz pistons 11 and 12 are inserted in the ends of the cylinder forming a very close sliding fit. These pistons are transparent to the radiation emitted by the maser. The inner faces 13 and 14, of pistons 11 and 12 are optically polished to provide high quality spherical surfaces and high dielectric mirrors are evaporated onto these surfaces. The mirrors are approximately 99% reflecting for those wavelengths at which emission is obtained from the device.

The cavity 15, bounded by the inside of cylinder 10 and mirrors 13 and 14, is completely filled with a liquid active material such as europium tris-benzoylacetonate in solution with ethyl and methyl alcohols. The optimum concentration range of europium tris-benzoylacetonate in the solution is in the range $9 \times 10^{17}$ to $1 \times 10^{19}$ molecules per cubic centimeter and the ratio of ethyl to methyl alcohols is 3 to 1. More detailed information on this material is disclosed in copending patent application Ser. No. 276,942 filed April 30, 1963 by A. Lempicki and H. Samelson. [It shall be noted that, although the particular embodiment of our invention described herein utilizes europium tris-benzoylacetonate as an active material, other liquid active materials may also be employed.]

The cylinder 10 is surrounded by a helical high-intensity xenon flash lamp 21. Electrodes 22 and 23 are connected to the ends of the helical flash tube 21 and a capacitor 24 coupled between the terminals. A power supply 25 maintains a constant voltage of about 10 kilovolts across capacitor 24.

The cylinder 10 is maintained at a temperature in the range $-120°$ C. to $-170°$ C. As the europium tris-benzoylacetonate solution cools, its volume decreases causing the pressure within the cavity to decrease at a rate of about 0.001 centimeter per centimeter per degree Kelvin. The combination of the surface tension and atmospheric pressure exerted on the outer ends 30 and 31 of pistons 11 and 12 forces the pistons inward keeping the cavity completely filled by the solution.

When the xenon lamp is flashed by applying a 20 kilovolt trigger pulse to wire 26 from trigger source 27, energy is absorbed by the europium tris-benzoylacetonate and stimulated radiation is obtained from the ends of pistons 11 and 12 as indicated by the arrows 28.

Figure 2:
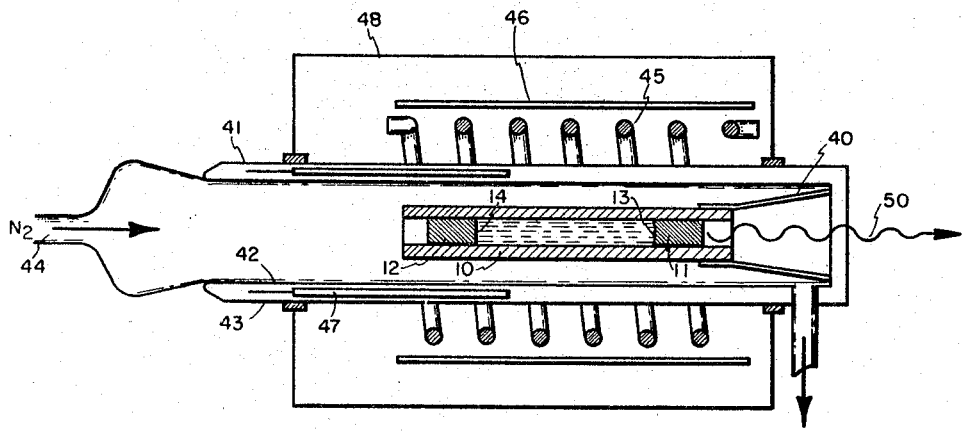
FIG. 2 is a more detailed cross-sectional view of apparatus for producing stimulated emission at reduced temperatures.

FIG. 2 is a more detailed cross-sectional view of apparatus employing our cell to obtain stimulated emission. As shown, the cell is supported by a cell holder 40 inside a dewar flash 41 having transparent inner and outer walls 42 and 43 respectively. Nitrogen gas introduced at the left end 44 maintains the temperature of the cell in the desired range of $-120°$ C. to $-170°$ C.

A helical flash tube 45 surrounds flask 41 and is provided with a reflector 46 which directs most of the radiation toward the cell. A removal filter sleeve 47 blocks off much of the radiation outside the band required to excite the active material in cavity 15 thereby reducing heating of the material. When europium tris-benzoylacetonate is used as the active material in cavity 15, a filter is selected which transmits radiation primarily in the range 3500 to 4500 Angstroms. The entire assembly is protected by an external housing 48.

In preparing the maser for operation one of the pistons 11 or 12 is removed from cylinder 10 and a measured amount of the alcohol solution of europium tris-benzoylacetonate poured into the cylinder. The cylinder is then placed in the dewar flask 41 and the temperature lowered by circulating nitrogen through the flask. After the temperature has been reduced to about $-150°$ C., the xenon lamp is flashed by power supplies similar to that shown in FIG. 1 but omitted in FIG. 2 for greater clarity. In the apparatus of FIG. 2 radiation is obtained only through transparent piston 11 which has a partially reflecting mirror surface 13.

Typically, the diameter of cylinder 10 is about 5 millimeters and the radius of curvature of the mirrors 13 and 14 approximately 50 millimeters. The gap between the pistons 11, 12 and the inside of cylinder 10 is approximately $10^{-5}$ inch and the surface finish of the pistons and bore of the cylinder is uniform to within 3 microns in order to provide a leak-proof sliding fit. The Q of the cavity is about $10^6$. When the cavity is filled with a solution of ethyl and methyl alcohols in the ratio 3 to 1, the concentration of europium tris-benzoylacetonate in the solution is $5.2 \times 10^{18}$ molecules per cubic centimeter and the energy supplied to flash tube 50 is above the critical value of 1000 joules, stimulated radiation is obtained as shown at 50. With this value of excitation, the emitted stimulated radiation has a wavelength of 6129 Angstroms and the width of the emission line is less than 0.3 Angstrom.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. An optical maser cell comprising
  (a) a hollow elongated enclosure having a longitudinal axis and first and second open ends, said enclosure further comprising an inner surface and an outer surface, a portion of said enclosure located between said first and second open ends being transparent,

(b) first and second spaced apart end elements positioned within said elongated enclosure, each of said elements having an inner face located opposite the inner face of the other end element, at least one of said elements being slidable with respect to and within said enclosure along said longitudinal axis and in fluid tight relationship therewith, at least one of said end elements being transparent, and (c) first and second reflective layers affixed to the inner faces of said first and second end elements respectively, the layer affixed to at least one of said transparent end element being only partially reflective, the reflective layers of said end elements and the inner surface of the transparent portion of said enclosure forming a resonant cavity.

2. Apparatus for producing stimulated emission comprising (a) a hollow transparent elongated cylinder having a longitudinal axis, first and second open ends, an inner surface and an outer surface, (b) an active liquid medium located within said hollow cylinder, (c) first and second spaced apart cylindrical pistons positioned within said hollow transparent cylinder, each of said pistons having an inner face located opposite the inner face of the other piston, said pistons being movable with respect to and within said enclosure along said longitudinal axis, said first piston being transparent, (d) first and second reflective layers affixed to the inner faces of said first and second pistons respectively, the layer affixed to the transparent piston being only partially reflective, the reflective layers of said pistons and the inner surface of said hollow cylinder forming a cavity for containing said active liquid medium, (e) a dewar flask surrounding said hollow cylinder, the interior of said flask being maintained at a temperature required to obtain stimulated emission from the medium within said resonant cavity, (f) a helical flash tube for producing pumping radiation surrounding said flask, and (g) filter means located between said flash tube and said flask, the radiation produced by said flash tube being transmitted through said filter means having wavelengths predominantly in the band required to excite the medium in said cavity.

References Cited by the Examiner

UNITED STATES PATENTS

| 3,172,057 | 3/1965 | Bennett | 331—94.5 |
| 3,210,687 | 10/1965 | Boyd et al. | 331—94.5 |
| 3,225,307 | 12/1965 | Weissman | 331—94.5 |

JEWELL H. PEDERSEN, *Primary Examiner.*

W. L. SIKES, *Assistant Examiner.*